Patented Apr. 12, 1938

2,113,767

UNITED STATES PATENT OFFICE 2,113,767

MANUFACTURE OF LAMINATED GLASS

Louis Paggi, Belleville, N. J., assignor, by mesne assignments, to E. I. du Pont de Nemours & Company, Wilmington, Del., a corporation of Delaware No Drawing. Application July 18, 1936, Serial No. 91,391

9 Claims. (Cl. 49—81)

This invention relates to the manufacture of laminated glass, i. e., safety glass, and, more particularly, to the treatment of the interlayer sheeting used therein.

The type of laminated glass herein considered comprises at least one sheet of glass bonded to a preformed sheet of organic plastic which is known as the "interlayer"; more generally, the plastic sheet or interlayer is interposed between two sheets of glass. In recent years, these interlayers have been made relatively pliable and soft; usually, this has been accomplished by increasing the proportion of plasticizer used in the plastic composition from which the interlayers are made and it is to this type of interlayer, comprising an organic plastic containing plasticizer, that the present invention relates.

Although these softer, more pliable interlayers have outstanding advantages for use in laminated glass, their tackiness, or self-adhesiveness, at ordinary temperatures has raised a serious problem in handling and shipping. Many of the more desirable plastic compositions for interlayers have heretofore been barred from use because they were so tacky, or self-adhesive, that no commercially practical method of handling and shipping them could be devised.

The plastic for the interlayer is either formed into individual sheets which are stacked for handling and shipping, or is rolled up on itself on a mandrel in continuous lengths for handling and shipping. Even where the interlayer sheeting is not obviously tacky in the ordinary sense of the word, when it is cut in sheets and piled in a stack, or when it is rolled up in continuous lengths, under normal conditions of shipping and storage, it tends to become stuck together sufficiently so that it cannot be separated without difficulty or damage; the term "self-adhesive" is used herein to denote that degree of adhesiveness of the interlayer sheeting which may not necessarily be obviously tacky but which possesses a latent adhesiveness that may only become effective under storage conditions involving pressure (the weight of material above or from the tension in a tight roll) and summer warmth.

Where the interlayer sheet is not only self-adhesive but actually tacky, a further difficulty in using it is that of excluding air bubbles between the interlayer and the glass. The sticky and pliable nature of such interlayer sheets makes it difficult to lay them out flat on the glass without trapping air and this softness and comparatively ready flowability makes it impractical to squeeze out such trapped air from the laminated glass without squeezing out the interlayer material itself from between the glasses. It will thus be seen that, even if the interlayer sheeting could be made right at the point of lamination, thus avoiding the difficulty in shipping and storing tacky interlayer sheets, there would still be the difficulty in the actual laminating step.

An object of the present invention is to provide a practical method of handling, packing, shipping, and storing self-adhesive or tacky interlayer sheets comprising an organic plastic containing a plasticizer therein, either as individual sheets or in continuous lengths. A further object is to provide a practical method of eliminating the tackiness of this type of interlayer sheet even though there is no necessity of completely eliminating the self-adhesive characteristic of the sheet. A further object is to provide a method of accomplishing the above results without any appreciable increase in the cost of making laminated glass and without detrimental effect upon the appearance or protective character of the laminated glass. A still further object is to provide a method of treating the interlayer sheets so that they can be handled without difficulty and yet which will involve no additional steps in the regular lamination routine. Other objects of the invention will be apparent from the description given hereinafter.

The above objects are accomplished according to the present invention by coating the surface of an interlayer sheet of organic plastic containing sufficient plasticizer therein to make the sheet tacky or, at least, self-adhesive, with a thin layer of similar organic plastic in which the plasticizer content is sufficiently low so that said layer will be non-tacky and, preferably, non-self-adhesive, and thereafter bonding said interlayer sheet to glass without removing said layer.

Preferably, both sides of the interlayer sheet are coated with an organic plastic having the same base as the interlayer but containing no plasticizer, the thickness of the coating being sufficient to make the interlayer sheet non-self-adhesive, if desired, or relatively thinner if a non-tacky, but not necessarily non-self-adhesive, interlayer sheet will answer the purpose. The interlayer sheet, thus treated, can be handled without inconvenience and may be laminated with glass, with or without adhesive, as desired, the coated interlayer sheeting having substantially the same properties as the uncoated interlayer in so far as bonding to glass is concerned.

The present invention resides in the discovery that the tackiness or self-adhesiveness of this soft type of interlayer sheeting may be eliminated by coating it with a thin layer of an organic plastic comprising the same base material as that contained in the interlayer or one closely related thereto and either no plasticizer or plasticizer in a proportion so small that the organic plastic when deposited as a layer, is no longer tacky, and yet, when the interlayer thus coated is subjected to the usual laminating routine, it will bond to the glass as well, to all intents and purposes, as the uncoated interlayer will. It is believed that the unexpected fact that the protective coating has no deleterious effect on the bond to the glass, is partly due to the plasticizer in the interlayer sheet penetrating the non-tacky coating under the laminating conditions.

It should be understood that though the base of the organic plastic in both the interlayer proper and the non-tacky protective coating should be the same in so far as general type is concerned, the invention contemplates within its scope the use of different but closely related organic compounds where one is better adapted for use in the interlayer per se and the other for use in the non-tacky coating. For example, two closely related but not identical aldehyde-modified polyvinyl acetal resins or cellulose acetates might advantageously be employed, the one used in the coating having less inherent tendency to be tacky or being readily soluble in a volatile solvent having little or no solvent action on the other. The use of either the identical base materials or two closely related base materials are full equivalents in so far as this invention is concerned.

The following examples are given to illustrate specific embodiments of the invention, parts being given by weight:

In Example 1 a self-adhesive interlayer of a base of an aldehyde-modified polyvinyl acetate resin, "A", is coated with a solution of another closely related aldehyde-modified polyvinyl acetate resin, "B". These resins are made from polyvinyl acetate by hydrolysis and interaction with formaldehyde, and their molecular compositions may be expressed in terms of percentages of vinyl acetate, vinyl alcohol and vinyl formal, as determined by analysis. The resin designated "A" is typical of resins of this class in which the percentage of vinyl acetate is not over 12.5, that of vinyl alcohol not over 12.5 and vinyl formal not less than 75. The resin designated "B" is typical of resins of this class in which the percentage of vinyl acetate is not over 10, that of vinyl alcohol not less than 20 and that of vinyl formal not more than 70.

*Example 1.*—A self-adhesive sheeting composed of resin "A", containing:

| | Parts |
|---|---|
| Vinyl acetate 9.7% | |
| Vinyl alcohol 12.4% | 49.5 |
| Vinyl formal 77.9% | |
| Diethyl phthalate | 30 |
| Dimethyl phthalate | 20.5 | is sprayed with a warm solution composed of resin "B", containing:

| | Parts |
|---|---|
| Vinyl acetate 4.2% | |
| Vinyl alcohol 27.6% | 2.5 |
| Vinyl formal 68.2% | |
| Ethyl alcohol | 70 |
| Distilled water | 27.5 |

The thickness of the coating, after evaporation of the solvent, is about 0.002 inch.

The sprayed sheeting is no longer self-adhesive. Successive layers of it stacked under a weight of 12 pounds per square inch at 45° C. for 24 hours do not stick together.

The sprayed sheeting is laid out flat on glass with no difficulty, and is satisfactorily bonded between two panes of clean glass by the application of a temperature of 135° C. and a pressure of 180–200 pounds per square inch in an autoclave, without the use of auxiliary adhesive.

*Example 2.*—The self-adhesive sheeting of Example 1 is sprayed with the solution of Example 1, but with a thinner coating, which after drying has a thickness of about 0.0005 inch. This coated sheeting will stick together somewhat in the artificial storage test described in Example 1, i. e., under some pressure, but can be laid out flat on glass without sticking to the glass, and will bond to glass, under the pressure and temperature of Example 1, without auxiliary adhesive.

*Example 3.*—This is the same as Example 1, except that the coating is applied by dipping the sheeting in the coating solution, and drying. The thickness of the coating is the same, and it gives the same results as those of the sprayed coating of Example 1.

*Example 4.*—A self-adhesive sheeting composed of:

| | Parts |
|---|---|
| Cellulose acetate (acele type) | 42 |
| Dimethyl phthalate | 58 | is sprayed with a hot solution of:

| | Parts |
|---|---|
| Cellulose acetate (plastics type) | 5 |
| 70% ethyl alcohol | 80 |
| Acetone | 15 |

The thickness of the coating, after evaporation of the solvent, is about 0.002 inch.

The coated interlayer is not self-adhesive, and successive layers of it do not stick to each other under conditions of storage.

The coated interlayer is laid out flat on glass without difficulty, and is satisfactorily bonded between two panes of glass, without the use of an auxiliary adhesive, by the application of a pressure of 180 pounds per square inch and a temperature of 140° C., in an autoclave.

*Example 5.*—A self-adhesive interlayer sheeting composed of:

| | Parts |
|---|---|
| Pyroxylin (of approximately 11% nitrogen content, of the type customarily used in plastics) | 44 |
| Diamyl phthalate | 56 | is sprayed with a solution composed of:

| | Parts |
|---|---|
| Pyroxylin (the same as above) | 5 |
| Acetone | 95 |

The thickness of the coating, after evaporation of the solvent, is about 0.0018 inch and the coated interlayer is non-tacky.

The sprayed sheeting is laid out flat on glass without difficulty, and is satisfactorily bonded between two panes of glass by the application of a temperature of 135° C. and a pressure of 180 pounds per square inch, without the use of auxiliary adhesive.

*Example 6.*—A self-adhesive interlayer sheeting of a base of the synthetic resin known as "Vinylite X" (Chemical and Metallurgical Engineering, 43 177 (April 1936)) and containing plasticizer, is sprayed with a solution of 2.5 parts of the same resin in 97.5 parts of methanol. The thickness of the coating, after evaporation of the solvent, is between 0.0015 and 0.0020 inch and the sprayed interlayer is non-tacky.

The sprayed interlayer sheeting is laid out flat on glass without difficulty, and is satisfactorily bonded between two panes of glass by the application of a temperature of 121° C. and a pressure of 180 pounds per square inch, without the use of auxiliary adhesive.

*Example 7.*—A self-adhesive interlayer sheeting composed of:

| | Parts |
|---|---|
| Polymethyl alpha methacrylate | 45 |
| Diamyl phthalate | 55 | is sprayed with a solution composed of:

| | Parts |
|---|---|
| Polymethyl alpha methacrylate | 3 |
| Acetone | 97 |

The thickness of the coating, after evaporation of the solvent, is about 0.002 inch and the coated interlayer is non-tacky.

The coated interlayer sheet is bonded to glass by the application of heat and pressure.

*Example 8.*—A self-adhesive interlayer sheeting composed of:

| | Parts |
|---|---|
| Cellulose acetate (acele type) | 35 |
| Dimethyl phthalate | 65 | is sprayed with a hot solution composed of:

| | Parts |
|---|---|
| Cellulose acetate (acele type) | 5 |
| Methyl acetate | 95 |

The thickness of the coating, after evaporation of the solvent, is about 0.001 inch.

The coated interlayer is non-tacky, but not completely non-self-adhesive. It can be bonded to glass without auxiliary adhesive.

*Example 9.*—This is the same as Example 8, except that the coating is applied by dipping the sheeting in the coating solution, and drying. The thickness of the coating is the same, and it gives the same results as those of the sprayed coating of Example 2.

*Example 10.*—A self-adhesive interlayer sheeting composed of:

| | Parts |
|---|---|
| Formaldehyde-modified polyvinyl acetate of type "B" above | 50 |
| Dimethyl phthalate | 50 | is sprayed with a solution composed of:

| | Parts |
|---|---|
| The same resin | 2.5 |
| Alcohol | 70.0 |
| Distilled water | 27.5 |

The thickness of the coating, after evaporation of the solvent, is between 0.0015 and 0.002 inch.

This coated interlayer sheeting will stick together somewhat in the artificial storage test described in Example 1, i. e., under some pressure, but it can be laid out flat on glass without sticking to the glass, and will bond to glass, under the pressure and temperature of Example 1, without auxiliary adhesive.

*Example 11.*—A self-adhesive interlayer sheeting composed of:

| | Parts |
|---|---|
| Formaldehyde-modified polyvinyl acetate of type "A" above | 49.5 |
| Dimethyl phthalate | 20.5 |
| Diethyl phthalate | 30.0 | is sprayed with a solution composed of:

| | Parts |
|---|---|
| The same resin | 2.5 |
| Alcohol | 70.0 |
| Distilled water | 27.5 |

The thickness of the coating, after evaporation of the solvent, is between 0.0015 and 0.002 inch.

This coated interlayer sheeting has substantially the same properties as that in Example 9.

The coating substance need not be, in and of itself, a complete adhesive for effecting lamination of interlayer and glass under heat and pressure. It may be modified or supplemented by other ingredients at the time of lamination, and thus come to contribute an element, rather than the whole, of the adhesive effect. This is illustrated in Example 12.

*Example 12.*—A self-adhesive interlayer sheeting composed of:

| | Parts |
|---|---|
| Ethyl cellulose | 45 |
| Diamyl phthalate | 55 | is sprayed with a solution composed of:

| | Parts |
|---|---|
| Ethyl cellulose | 2.5 |
| Acetone | 97.5 |

The thickness of the coating, after evaporation of the solvent, is between 0.0015 and 0.0020 inch.

The sprayed sheeting is laid out without difficulty on glass previously covered with an auxiliary adhesive layer deposited by spraying with a solution composed of:

| | Parts |
|---|---|
| Ethyl cellulose (low viscosity) | 67.5 |
| Diamyl phthalate | 101.25 |
| Camphor | 101.25 |
| Ethyl acetate | 405.0 |
| Butyl acetate | 600.0 |
| Acetone | 225.0 | and is satisfactorily bonded between glasses thus coated, by the application of heat and pressure.

The above examples illustrate various specific embodiments coming within the scope of the invention. The method of applying the non-tacky layer to the interlayer sheeting may be any of those used in the art such as spraying, brushing, dipping, and the like. It will be obvious that the non-tacky layer should be applied to the sheeting in such a manner and, if necessary, with the assistance of such liquid vehicles, that it will be of suitable thickness and uniformity and, further, will be bonded to the surface of the interlayer sheeting so that it will not become detached during ordinary handling.

The methods of spraying and dipping are to be preferred in commercial practice and may be readily made a part of the sequence of operations in the production of interlayer sheeting in continuous manner, the application of the coating being made at whatever may be the most advantageous point in the process, either before, during, or after the seasoning step.

The selection of a liquid solvent or vehicle for the coating substance in any specific instance will be based upon the ordinary knowledge of those skilled in the art. In general, a better union between the non-tacky layer and the surface of the interlayer sheeting is obtained by the use, as a vehicle for the former, of a liquid which is a solvent for the latter, but, on the other hand, the use of such a liquid which, to some degree, penetrates beneath the surface of the interlayer sheeting, will necessitate a seasoning treatment of the latter to effect its removal. If the coating substance in a vehicle which is a solvent for the interlayer sheeting, is applied to the latter prior to the completion of the seasoning operation which the interlayer sheeting is undergoing at any rate as a means of removal from it of solvent used in its manufacture, then the additional seasoning necessitated by the presence of further solvent in the coating mixture will not ordinarily extend materially the time required for the seasoning treatment.

It is preferred that the plasticizer be omitted entirely from the plastic used to coat the interlayer sheeting, although plasticizer may be present as long as there is not sufficient to give a tacky layer. It has been observed that, when the coating is sprayed on the interlayer sheeting, a plastic containing a relatively high proportion of plasticizer may be used and, in some instances, a non-tacky layer has resulted where the proportion of plasticizer in the plastic dissolved up and sprayed on the interlayer sheeting, has been equal to that in the interlayer sheeting which was tacky. A partial explanation of this is believed to be due to the fact that some plasticizer is lost in the spraying. When using relatively high plasticizer content plastics for the non-tacky layer, spraying is different and not equivalent to brushing and dipping to this extent.

As shown in the specific examples, the invention is generally applicable to the various organic plastics used in the manufacture of interlayers. It is particularly applicable to interlayers having a base of a polyvinyl acetal resin, or cellulose acetate, but is also applicable to interlayers made of methacrylate resins, cellulose nitrate, and the like, the principle of the invention being identical in each instance.

The specific examples give numerous illustrations of the thickness of the protective layer to give non-tacky and non-self-adhesive surfaces with various specific plastic compositions. In commercial operations the optimum thickness of the protective layer required under the conditions to which the interlayer sheeting is to be subjected, can be readily determined by tests. In all instances, a relatively thin layer is adequate and a thinner layer will suffice where the interlayer sheeting will be handled during the winter months and hence not be subjected to elevated temperature, or where it is not necessary that the interlayer sheeting be non-self-adhesive.

In copending application Serial No. 91,426 filed July 18, 1936 entitled "Manufacture of laminated glass", Maurice L. Macht, applicant, has disclosed a means of overcoming the self-adhesiveness of interlayer sheeting by depositing on the surface of the sheeting a thin layer of a non-self-adhesive substance inert toward the plastic material of the sheeting and soluble in a liquid inert toward the plastic material. The interlayer sheeting thus protected can be handled and shipped conveniently but the non-self-adhesive layer must be removed before the sheet can be bonded to glass. Preferably, a puverulent, non-self-adhesive water-soluble solid such as borax is used to coat the sheeting and it is washed off with water prior to the actual laminating step.

Applicant has discovered that tacky interlayer sheeting may be coated with a thin layer of an organic plastic comprising the same base material as that contained in the interlayer or one closely related thereto and either no plasticizer or plasticizer in proportion so small that the layer will be non-tacky and yet still self-adhesive and then coated with pulverulent borax, or the like, to make the sheeting definitely non-self-adhesive while being handled and shipped. When the sheeting is to be laminated, the borax or other water-soluble solid can be washed off, thus leaving the sheeting self-adhesive which is no disadvantage at this point, but non-tacky, so that it can be readily laid out flat on the glass pane without trapping air and then bonded to the glass in the usual manner. It will be understood that the thin layer of the organic plastic applied to the interlayer sheeting to overcome its tackiness is not removed with the borax or other water-soluble solid used to overcome the self-adhesiveness of the sheet.

The present invention provides a highly practical method of eliminating tackiness or self-adhesiveness of interlayer sheetings thus facilitating the handling, shipping, and laminating of the softer type of interlayers. The protective layer of the present invention may be readily and inexpensively applied to the interlayer sheeting and has the advantage that it does not have to be removed before lamination since it contributes all or part of the adhesive effect required for the ultimate bonding of the sheeting to glass. Further, the protective layer on the interlayer sheeting does not complicate the established general technique of bonding interlayer to glass, nor does it have any deleterious effect on the finished laminated glass.

As many apparently widely different embodiments of this invention may be made without departing from the spirit and scope thereof, it is to be understood that the invention is not limited to the specific embodiments thereof except as defined in the appended claims.

I claim:

1. An interlayer for use in laminated glass comprising a sheet of organic plastic containing sufficient plasticizer therein to make the sheet tacky, having its surfaces coated with a thin layer of a similar organic plastic in which the plasticizer content is so small that said layer will be non-tacky, said layer being adapted to form at least a part of the adhesive bonding said interlayer to glass.

2. An interlayer for use in laminated glass comprising a sheet of organic plastic containing sufficient plasticizer therein to make the sheet self-adhesive, having its surfaces coated with a thin, non-self-adhesive layer of a similar organic plastic containing no plasticizer, said layer being adapted to form at least a part of the adhesive bonding said interlayer to glass.

3. An interlayer for use in laminated glass comprising a sheet of polyvinyl acetal resin plastic containing sufficient plasticizer therein to make the sheet tacky, having its surfaces coated with a thin layer of a similar polyvinyl acetal resin plastic in which the plasticizer content is so small that said layer will be non-tacky, said layer being adapted to form at least a part of the adhesive bonding said interlayer to glass.

4. An interlayer for use in laminated glass comprising a sheet of cellulose derivative plastic containing sufficient plasticizer therein to make the sheet tacky, having its surfaces coated with a thin layer of a similar cellulose derivative plastic in which the plasticizer content is so small that said layer will be non-tacky, said layer being adapted to form at least a part of the adhesive bonding said interlayer to glass.

5. In the manufacture of laminated glass, the steps comprising coating the surface of an interlayer sheet of organic plastic containing sufficient plasticizer therein to make the sheet tacky, with a thin layer of a similar organic plastic in which the plasticizer content is so small that said layer will be non-tacky, and thereafter bonding said interlayer sheet to glass without removing said layer.

6. In the manufacture of laminated glass, the steps comprising coating the surface of an interlayer sheet of organic plastic containing sufficient plasticizer therein to make the sheet self-adhesive, with a thin layer of a similar organic plastic containing no plasticizer, and thereafter bonding said interlayer sheet to glass without removing said layer.

7. In the manufacture of laminated glass, the steps comprising coating the surface of an interlayer sheet of polyvinyl acetal resin plastic containing sufficient plasticizer therein to make the sheet tacky, with a thin layer of a similar polyvinyl acetal resin plastic in which the plasticizer content is so small that said layer will be non-tacky, and thereafter bonding said interlayer sheet to glass without removing said layer.

8. In the manufacture of laminated glass, the steps comprising coating the surface of an interlayer sheet of a cellulose derivative plastic containing sufficient plasticizer therein to make the sheet tacky, with a thin layer of a similar cellulose derivative plastic in which the plasticizer content is so small that said layer will be non-tacky, and thereafter bonding said interlayer sheet to glass without removing said layer.

9. In the manufacture of laminated glass, the steps comprising coating the surface of an interlayer sheet of organic plastic containing sufficient plasticizer therein to make the sheet tacky, with a thin layer of a similar organic plastic in which the plasticizer content is so small that said layer will be non-tacky, then depositing on said layer of organic plastic a thin layer of a pulverulent non-self-adhesive solid substance inert toward said organic plastic and soluble in water to allow said interlayer sheet to be handled, shipped, and stored without danger of its adhering to itself or similar interlayer sheets, thereafter washing said non-self-adhesive solid substance from the interlayer sheet with water, drying said interlayer sheet and then bonding said interlayer sheet to glass without removing said layer of said organic plastic.

LOUIS PAGGI.

DISCLAIMER 2,113,767.—*Louis Paggi*, Belleville, N. J. MANUFACTURE OF LAMINATED GLASS. Patent dated April 12, 1938. Disclaimer filed February 11, 1939, by the assignee. *E. I. du Pont de Nemours and Company*.

Hereby enters this disclaimer to claims 1, 2, 3, 5, 6, and 7, of said specification.
[*Official Gazette March 14, 1939.*]

steps comprising coating the surface of an interlayer sheet of organic plastic containing sufficient plasticizer therein to make the sheet tacky, with a thin layer of a similar organic plastic in which the plasticizer content is so small that said layer will be non-tacky, and thereafter bonding said interlayer sheet to glass without removing said layer.

6. In the manufacture of laminated glass, the steps comprising coating the surface of an interlayer sheet of organic plastic containing sufficient plasticizer therein to make the sheet self-adhesive, with a thin layer of a similar organic plastic containing no plasticizer, and thereafter bonding said interlayer sheet to glass without removing said layer.

7. In the manufacture of laminated glass, the steps comprising coating the surface of an interlayer sheet of polyvinyl acetal resin plastic containing sufficient plasticizer therein to make the sheet tacky, with a thin layer of a similar polyvinyl acetal resin plastic in which the plasticizer content is so small that said layer will be non-tacky, and thereafter bonding said interlayer sheet to glass without removing said layer.

8. In the manufacture of laminated glass, the steps comprising coating the surface of an interlayer sheet of a cellulose derivative plastic containing sufficient plasticizer therein to make the sheet tacky, with a thin layer of a similar cellulose derivative plastic in which the plasticizer content is so small that said layer will be non-tacky, and thereafter bonding said interlayer sheet to glass without removing said layer.

9. In the manufacture of laminated glass, the steps comprising coating the surface of an interlayer sheet of organic plastic containing sufficient plasticizer therein to make the sheet tacky, with a thin layer of a similar organic plastic in which the plasticizer content is so small that said layer will be non-tacky, then depositing on said layer of organic plastic a thin layer of a pulverulent non-self-adhesive solid substance inert toward said organic plastic and soluble in water to allow said interlayer sheet to be handled, shipped, and stored without danger of its adhering to itself or similar interlayer sheets, thereafter washing said non-self-adhesive solid substance from the interlayer sheet with water, drying said interlayer sheet and then bonding said interlayer sheet to glass without removing said layer of said organic plastic.

LOUIS PAGGI.

DISCLAIMER 2,113,767.—*Louis Paggi*, Belleville, N. J. MANUFACTURE OF LAMINATED GLASS. Patent dated April 12, 1938. Disclaimer filed February 11, 1939, by the assignee. *E. I. du Pont de Nemours and Company.*

Hereby enters this disclaimer to claims 1, 2, 3, 5, 6, and 7, of said specification.
[*Official Gazette March 14, 1939.*]

DISCLAIMER 2,113,767.—*Louis Paggi*, Belleville, N. J. MANUFACTURE OF LAMINATED GLASS.
Patent dated April 12, 1938. Disclaimer filed February 11, 1939, by the assignee. *E. I. du Pont de Nemours and Company.*

Hereby enters this disclaimer to claims 1, 2, 3, 5, 6, and 7, of said specification.
[*Official Gazette March 14, 1939.*]